(12) United States Patent
Stix et al.

(10) Patent No.: US 7,373,054 B2
(45) Date of Patent: May 13, 2008

(54) OPTICAL CABLE SHIELD LAYER CONNECTION

(75) Inventors: Robert K. Stix, Red Bank, NJ (US); Jeremiah A. Mendez, Red Bank, NJ (US); James Jackson, White Marsh, MD (US); Maurice Kordahi, Atlantic Highlands, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 11/383,871

(22) Filed: May 17, 2006

(65) Prior Publication Data
US 2007/0269169 A1 Nov. 22, 2007

(51) Int. Cl.
*G02B 6/44* (2006.01)
(52) U.S. Cl. .................................... 385/100
(58) Field of Classification Search ........... 385/100
See application file for complete search history.

(56) References Cited

U.S. PATENT DOCUMENTS

| | | | |
|---|---|---|---|
| 4,032,205 A | 6/1977 | Taj | |
| 4,950,343 A | 8/1990 | Shimirak et al. | |
| 5,217,808 A * | 6/1993 | Cobb | 428/392 |
| 5,528,718 A | 6/1996 | Craig et al. | |
| 5,646,370 A | 7/1997 | Perkins | |
| 5,657,413 A * | 8/1997 | Ray et al. | 385/139 |
| 6,853,780 B1 * | 2/2005 | Brandi et al. | 385/104 |
| 2005/0180705 A1 * | 8/2005 | Elkins et al. | 385/100 |
| 2007/0009214 A1 * | 1/2007 | Elkins et al. | 385/100 |
| 2007/0104446 A1 * | 5/2007 | Lu et al. | 385/135 |

FOREIGN PATENT DOCUMENTS

| | | |
|---|---|---|
| EP | 0430533 | 6/1991 |
| WO | 93/11584 | 6/1993 |

OTHER PUBLICATIONS

European Communication and Search Report mailed Sep. 4, 2007 in connection with corresponding European Patent Application No. 07108023.8.

\* cited by examiner

*Primary Examiner*—Ellen E. Kim
(74) *Attorney, Agent, or Firm*—Grossman, Tucker, Perreault & Pfleger, PLLC

(57) ABSTRACT

An optical cable shield layer connection may include a wire electrically connected to a shield layer of an optical cable. The optical cable shield layer connection may also be sealed, for example, to prevent leak paths. The optical cable shield layer connection may be made when coupling the optical cable to a device or another cable, for example, using a universal joint such as the Millennia® Joint available from Tyco Telecommunications (U.S.) Inc. The wire may provide a ground path from the shield layer or a continuity path from the shield layer to another optical cable.

20 Claims, 4 Drawing Sheets

OPTICAL CABLE SHIELD LAYER CONNECTION

TECHNICAL FIELD

The present invention relates to optical cables and more particularly, to a system and method for establishing an electrical connection to a shield layer of an optical cable.

BACKGROUND INFORMATION

Optical fibers may be used as transmission paths for optical signals in communications networks. Such optical fibers often must extend across many miles and large bodies of water. To protect the optical fibers, particularly in an undersea or submarine environment, the optical fibers may be included in an optical cable that provides many layers of protection. An undersea or submarine optical cable may include, for example, layers of strength members, tubing, insulation, shielding, and sheaths depending upon the system environmental conditions.

Optical cables sometimes must be coupled to other cables or to other devices (e.g., to repeaters or branching units). To repair an optical cable, for example, one segment of the optical cable may be coupled to another segment of an optical cable using a cable-to-cable joint such as a universal joint as specified by the Universal Jointing (UJ) Consortium or a Millennia® Joint available from Tyco Telecommunications (U.S.) Inc. When joining optical cables including a metallic shield layer (sometimes referred to as a screen layer), an electrical connection may be made to the shield layer, for example, to provide a ground path or a continuity path from the shield layer to another cable segment or device. When such an electrical connection is made, the shield layer and the electrical connection may be sealed from water (e.g., in an undersea environment).

Existing processes for connecting wires to a screen layer in an optical cable have involved the use of heavy metal solders and chemical flux. Injection molding has been used over the connection to reinstate the insulation. Other processes have used corrosion resistant metals or a tapered screw thread and external collet arrangement. Such existing processes may involve extensive assembly time, potentially damaging heating, high cost and/or hazardous materials.

BRIEF DESCRIPTION OF THE DRAWINGS

These and other features and advantages will be better understood by reading the following detailed description, taken together with the drawings wherein.

DETAILED DESCRIPTION

An optical cable shield layer connection may include a wire electrically connected to a shield layer of an optical cable. The optical cable shield layer connection may also be sealed to prevent leak paths. The optical cable shield layer connection may be made when coupling the optical cable to a device or another cable, for example, using a universal joint such as the Millennia® Joint available from Tyco Telecommunications (U.S.) Inc. The wire may provide a ground path from the shield layer or a continuity path from the shield layer to another optical cable.

Figure 1:
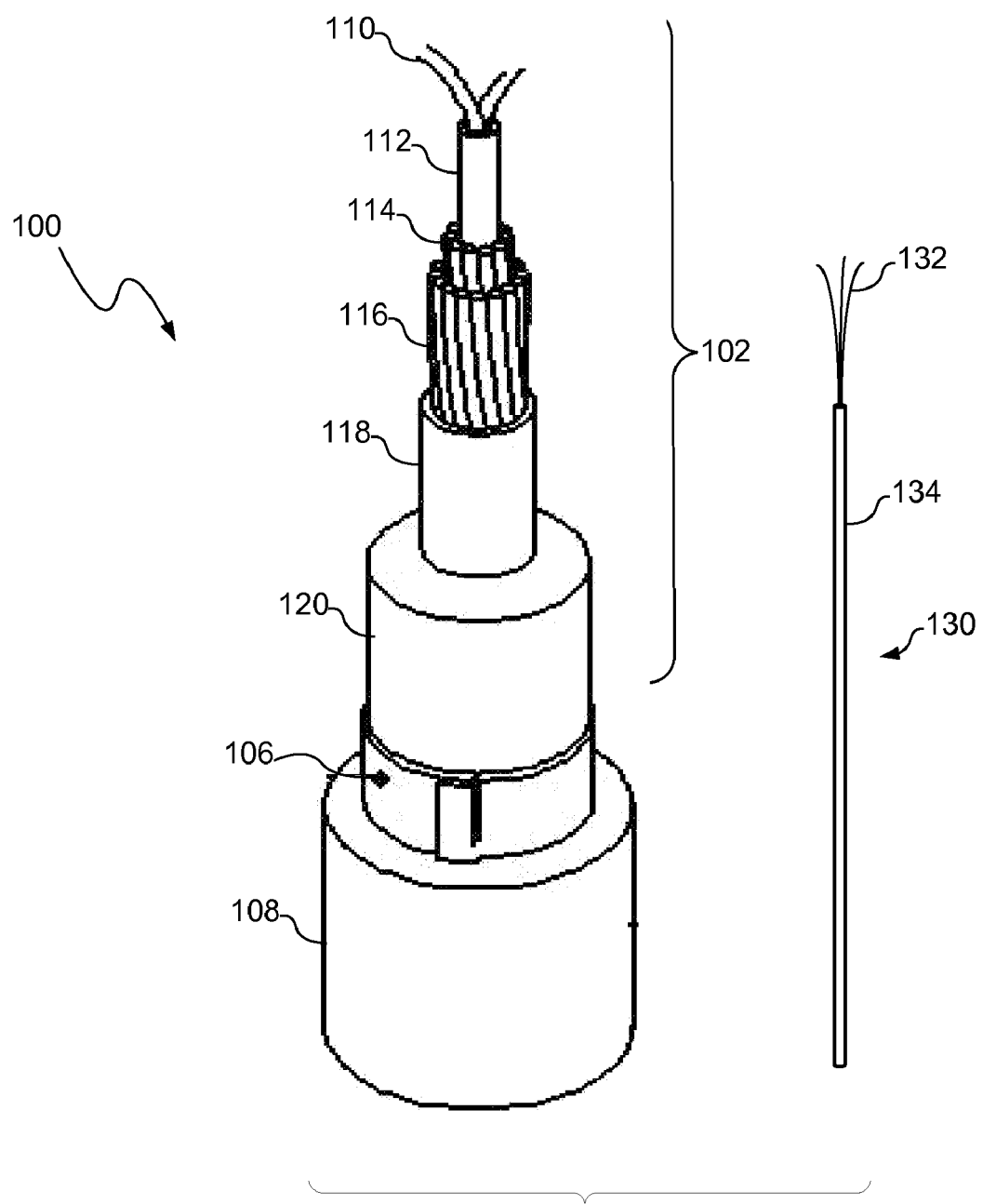
FIG. 1 is a perspective view of an optical cable and a wire, consistent with one embodiment of the present invention.

Referring to FIG. 1, an optical cable 100, consistent with one embodiment of the present invention, may include a cable core portion 102, at least one shield layer 106 and at least one outer sheath 108. The shield layer 106 of the optical cable 100 may be connected to a wire 130 including one or more conductors 132 (e.g., strands). The wire 130 may also include one or more insulation layers 134 around the conductor(s) 132. As described in greater detail below, the conductor(s) 132 of the wire 130 may be secured to an exposed portion of the shield layer 106 of the optical cable 100, folded back across the cable 100, and sealed.

In an exemplary embodiment, the shield layer 106 may be a screen layer formed by a steel tape. The outer sheath 108 may be a polymer sheath made, for example, from polyethylene. Although the outer sheath 108 is shown as the outermost layer, other layers (e.g., additional layers of protection in an armored cable) may also be used around the outer sheath 108. The cable core portion 102 may include optical fibers 110 within a tube 112 surrounded by one or more layers of strength members 114, 116 (e.g., steel wires). The cable core portion 102 may also include a conductive sheath 118 (e.g., a copper sheath) and an insulating sheath 120 (e.g., a polyethylene sheath). One example of the optical cable 100 is the SPA Cable (Special Application Cable) available from Tyco Telecommunications (U.S.) Inc. Those skilled in the art will recognize that other optical cables including other layers may also be used in accordance with the connection system and method described herein.

Referring to FIGS. 2A-2L, one embodiment of a system and method for the cable connection is described in greater detail. The order in which the acts are described below are not a limitation on the system or method for the cable connection. Those skilled in the art will recognize that the acts may be performed in a different order or that additional acts may be performed to establish the cable connection.

Figure 2A:
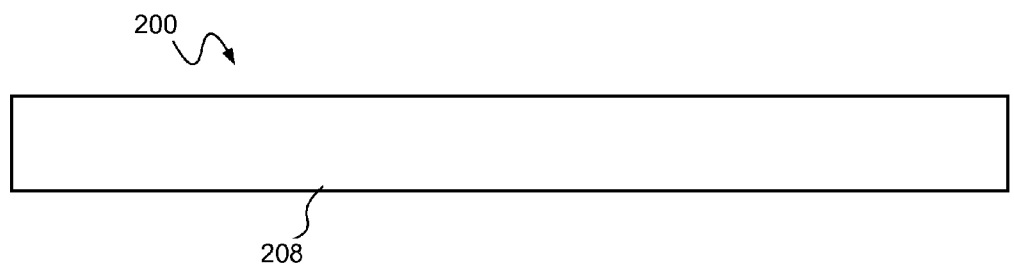
FIGS. 2A-2L are side views illustrating a method of connecting a wire to a shield layer of an optical cable, consistent with one embodiment of the present invention.

FIG. 2A shows an optical cable 200, such as the type described above, with an outer sheath 208 extending to an end of the cable 200. The optical cable 200 may be a segment of optical cable that is to be coupled to another segment of optical cable, for example, in a universal joint such as the Millennia® Joint available from Tyco Telecommunications (U.S.) Inc. To prepare for the connection, the cable 200 may be positioned in a jointing frame and cleaned in a manner known to those skilled in the art.

Figure 2B:
Figure 2C:
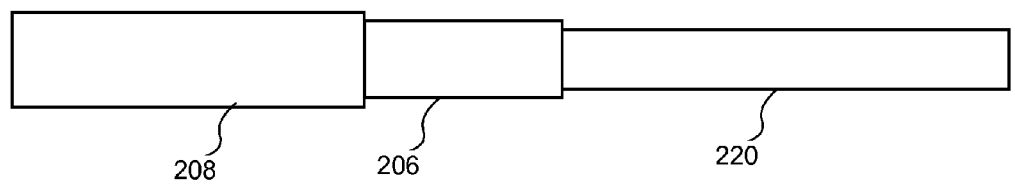

A portion of the outer sheath 208 (or any other outer layers) may be removed to expose a portion of a shield layer 206 (e.g., a screen layer formed from steel tape), as shown in FIG. 2B. A portion of the exposed shield layer 206 may be removed to expose a portion of an insulation layer 220, as shown in FIG. 2C. In one example, the exposed portion of the shield layer 206 extends about 38 mm from the outer sheath 208. If the shield layer 206 is a screen layer coated with a bonding agent, the bonding agent may be removed from the exposed portion of the shield layer 206. The exposed portion of the shield layer 206 and portions of the outer sheath 208 and the insulation layer 220 may also be prepared, for example, by sanding with an aluminum oxide cloth and cleaning with Isopropyl Alcohol (IPA).

Figure 2D:
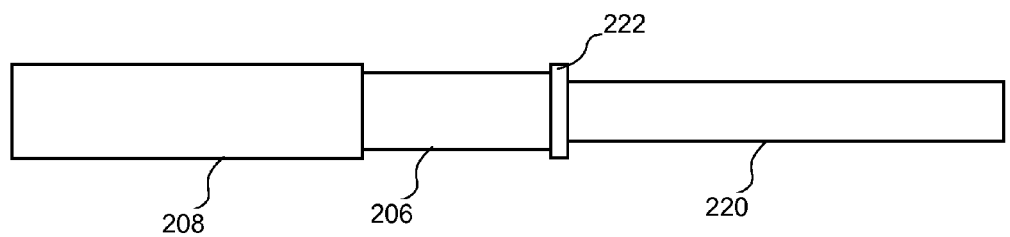

A stress relief termination (SRT) 222 may be placed on the shield layer 206, as shown in FIG. 2D, to smooth any discontinuities in the electrical field that may occur at an abrupt termination of the shield layer 206 of a powered cable. Additionally, the SRT 222 may provide an additional void filling for sealants 250 applied later in the process, as described below. The SRT 222 may be a self-sticking tape that adheres to itself and to the shield layer 206 and may be made of a high voltage stress relief material, such as epichlorohydrin polymer. In one example, the SRT 222 may be positioned at the end of the shield layer 206 and may have a width of about 9.5 mm.

Figure 2E:
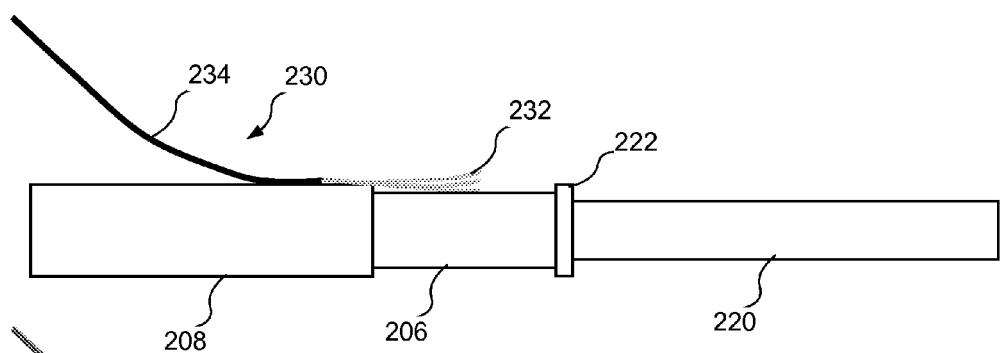

A wire 230 may be positioned with a length of exposed conductor(s) 232 on the exposed shield layer 206, as shown in FIG. 2E. In one example, the length of the conductors 232 on the shield layer 206 may be about 32 mm. The wire 230 may be oriented such that the conductors 232 extend generally in the axial direction of the shield layer 206 and an insulation layer 234 of the wire 230 extends generally in the direction of the outer sheath 208 of the optical cable 200. Those skilled in the art will recognize that the wire and conductors may be positioned with other orientations and configurations.

Figure 2F:
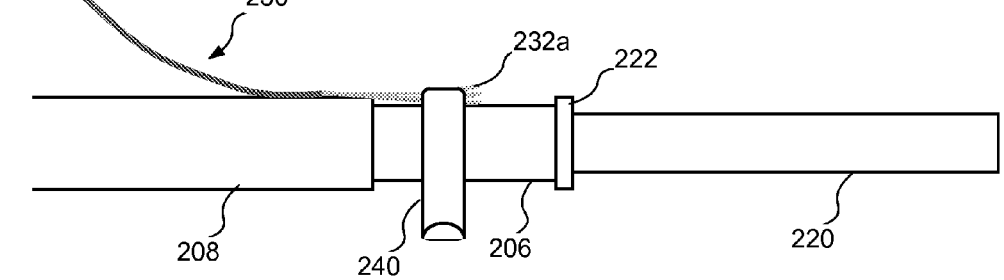

A clamp 240 may be positioned over a first conductor portion 232a to secure the first conductor portion 232a against the shield layer 206, as shown in FIG. 2F. In one example, the clamp 240 may be positioned about 25 mm from the end of the outer sheath 208. The clamp 240 may be a spring clamp wrapped or coiled around the first conductor portion 232a several times (e.g., twice) to secure the first conductor portion 232a against the shield layer 206. Alternatively, the clamp 240 may be a spring clamp positioned on the shield layer 206 first. The first conductor portion 232a may then be positioned on the spring clamp 240 and the shield layer 206, and the spring clamp 240 may be wrapped around the first conductor portion 232a to secure the first conductor portion 232a between portions or coils of the spring clamp 240. Those skilled in the art will recognize that other types of clamps may also be used to secure the conductor(s).

Figure 2G:
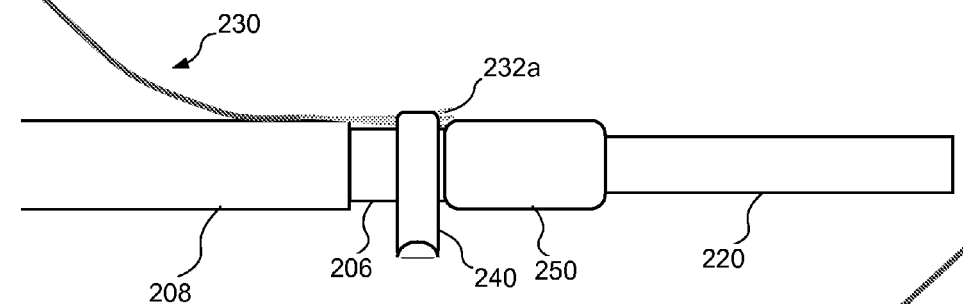

After clamping the first conductor portion 232a against the shield layer 206, a first portion of sealant 250 may be applied over at least a portion of the shield layer 206, as shown in FIG. 2G. The sealant 250 may also be applied over at least a portion of the insulation layer 220 and may cover the SRT 222. The sealant 250 may be a thermoplastic sealant such as a thermoplastic adhesive that may be wrapped around the cable 200. One example of a thermoplastic adhesive is the type known as red sealant. In one example, two layers of the sealant 250 may be applied and the sealant 250 may extend along about 38 mm of the cable.

Figure 2H:
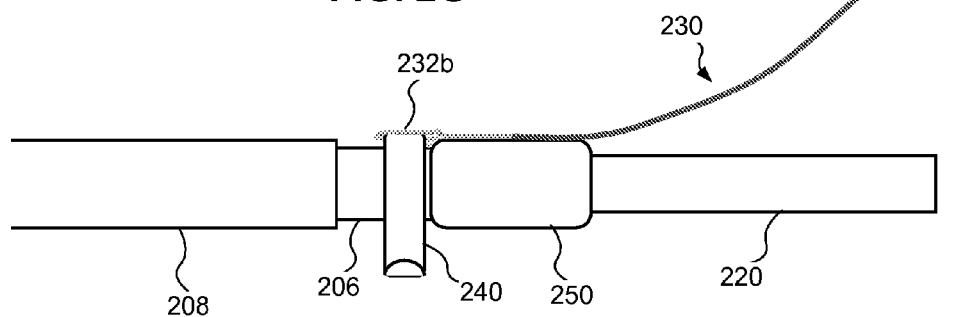
Figure 2I:
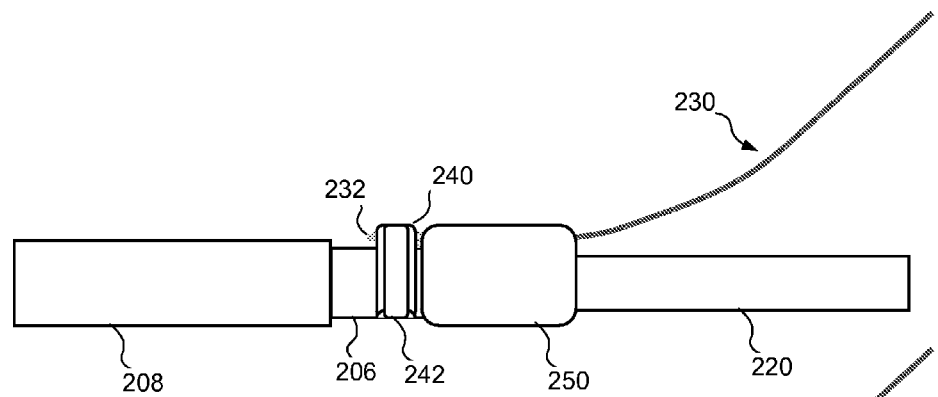

After the first portion of sealant 250 is applied, the wire 230 may be folded over and embedded into the sealant 250, as shown in FIG. 2H. To embed the wire 230, for example, one or more additional layers of a thermoplastic adhesive may be applied or wrapped over the wire 230. Those skilled in the art will recognize that other types of sealant may be used to embed the wire. Although the exemplary embodiment shows the wire 230 folded over and oriented generally along the axial direction of the cable, other orientations of the wire may be possible. For example, the wire 230 may be angled relative to the axial direction of the cable or helically wrapped around at least a portion of the cable (e.g., around the sealant 250). The wire 230 may also be folded before any sealant 250 is applied.

When the wire 230 is folded over, a second conductor portion 232b lies against a first clamp portion of the clamp 240. A second clamp portion of the clamp 240 may then secure the second conductor portion 232b against the first clamp portion of the clamp 240, FIG. 2I. A metallic tape 242 (e.g., copper tape) may then be wrapped around the clamp 240 to hold the clamp 240. In an exemplary embodiment where the clamp 240 is a spring clamp, a single spring clamp may be wrapped or coiled around both the first and second conductor portions 232a, 232b and the clamp portions are coils of the spring clamp. Alternatively, the clamp 240 may include separate clamp portions or members that secure the first and second conductor portions 232a, 232b, respectively.

Figure 2J:
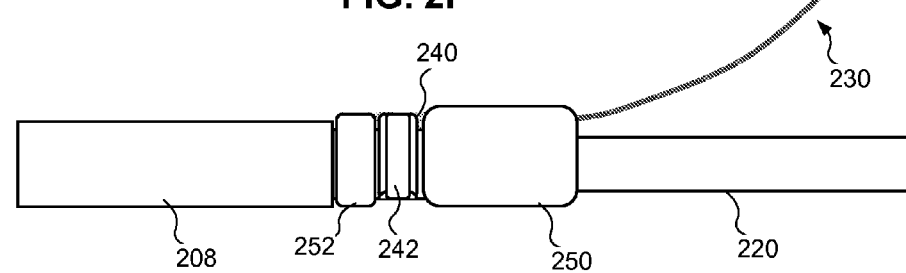

Another portion of sealant 252 may also be applied to the shield layer 206 between the clamp 240 and the outer sheath 208, as shown in FIG. 2J. The sealant 252 may also be a thermoplastic sealant, such as layers of a thermoplastic adhesive wrapped around the shield layer 206. Those skilled in the art will recognize that other portions of sealant (e.g., layers of thermoplastic adhesive) may also be applied to other locations, for example, around the outer sheath 208.

Figure 2K:
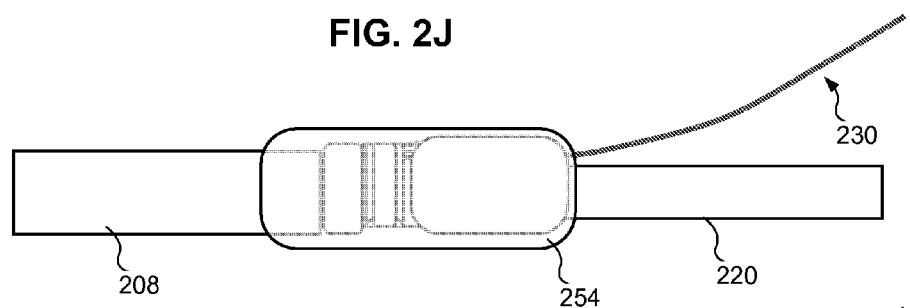
Figure 2L:
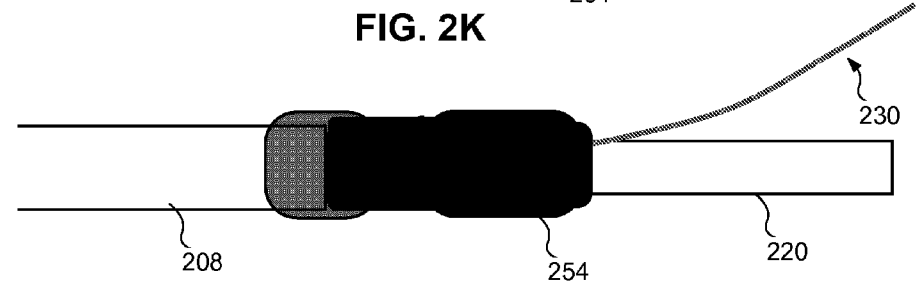

An additional portion of sealant 254 may be applied over the entire connection, as shown in FIG. 2K. The sealant 254 may include a heat shrink member (e.g., a heat shrink tube) with thermoplastic adhesive on an inner surface of the member. The heat shrink member may be positioned over the connection, and heat may be applied to shrink the member over the connection, as shown in FIG. 2L. The heat may be applied using an electric hot air gun, gas or other fueled heater known to those skilled in the art. In one example, the sealant 254 may cover about 24 mm of the outer sheath 208.

Accordingly, the resulting optical cable system connection establishes an electrical connection to a shield layer of the cable and seals the connection and shield layer against leak paths. The connection may be made with a relatively short assembly time, without application of excessive heat, without the use of materials hazardous to a marine environment, and for relatively low cost. The optical cable shield layer connection may be established on both submarine optical cables and on land optical cables (e.g., adjacent to the submarine optical cables). The connection may be used during installation and repair of cable systems as well as during factory assembly of cable systems.

Consistent with one embodiment of the present invention, a method includes: providing an optical cable with an exposed shield layer extending from an outer sheath and a wire including at least one conductor; securing a first conductor portion of the at least one conductor of the wire to the exposed shield layer; folding the wire; securing a second conductor portion of the at least one conductor of the wire; and sealing at least a portion of the shield layer and the at least one conductor of the wire in a sealant.

Consistent with another embodiment of the present invention, an optical cable shield layer connection system includes an optical cable including a cable core portion, an outer sheath, and a shield layer located between the outer sheath and the cable core portion. The shield layer may include an exposed portion extending from the outer sheath. The connection system also includes a wire including at least one conductor with at least a first conductor portion secured in contact with the exposed portion of the shield layer and a second conductor portion folded relative to the first conductor portion. The connection system also includes at least one clamp securing the first and second conductor portions to the shield layer and a sealant encapsulating the conductor and the exposed portion of the shield layer.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method comprising:
providing an optical cable with an exposed shield layer extending from an outer sheath and a wire including at least one electrical conductor;
securing a first electrical conductor portion of said at least one electrical conductor of said wire in contact with said exposed shield layer;
folding said wire;
securing a second electrical conductor portion of said at least one electrical conductor of said wire; and
sealing at least a portion of said shield layer and said at least one electrical conductor of said wire in a sealant.

2. The method of claim 1 wherein providing said optical cable comprises removing a portion of said outer sheath of said optical cable to expose said exposed shield layer and removing a portion of said exposed shield layer.

3. The method of claim 2 wherein providing said optical cable comprises cleaning said exposed shield layer.

4. The method of claim 1 further comprising securing said shield layer with a stress relief termination.

5. The method of claim 1 wherein securing said first electrical conductor portion comprises positioning said first electrical conductor portion against said shield layer and securing a spring clamp around said first electrical conductor portion to hold said first electrical conductor portion against said shield layer.

6. The method of claim 5 wherein securing said second electrical conductor portion comprises positioning said second electrical conductor portion against said spring clamp and securing said spring clamp around said second electrical conductor portion to hold said second electrical conductor portion between portions of said spring clamp.

7. The method of claim 6 further comprising wrapping a metallic tape around said spring clamp.

8. The method of claim 1 wherein sealing said portion of said shield layer and said at least one electrical conductor comprises applying at least a first portion of said sealant to an end portion of said shield layer before folding over said wire and then embedding said wire into said first portion of said sealant after folding over said wire.

9. The method of claim 8 wherein sealing said portion of said shield layer and said at least one electrical conductor comprises applying at least a second portion of said sealant over said at least one electrical conductor and an end portion of said outer sheath.

10. An optical cable shield layer connection system comprising:
an optical cable comprising a cable core portion, an outer sheath, and a shield layer located between said outer sheath and said cable core portion, said shield layer including an exposed portion extending from said outer sheath;
a wire including at least one electrical conductor, said electrical conductor including at least a first electrical conductor portion secured in contact with said exposed portion of said shield layer and a second electrical conductor portion folded relative to said first electrical conductor portion;
at least one clamp securing said first and second electrical conductor portions to said shield layer; and
a sealant encapsulating said electrical conductor and said exposed portion of said shield layer.

11. The cable connection system of claim 10 wherein said shield layer is a screen layer.

12. The cable connection system of claim 10 wherein said cable core portion includes a plurality of optical fibers, a tube holding said optical fibers, at least one layer of strength members around said tube, a conductive sheath around said strength members, and an insulation layer around said conductive sheath.

13. The cable connection system of claim 10 wherein said outer sheath is a polymer sheath.

14. The cable connection system of claim 10 wherein said at least one electrical conductor includes a plurality of electrical conductor strands.

15. The cable connection system of claim 10 wherein said clamp includes a spring clamp secured around said first and second electrical conductor portions and said shield layer, and wherein said first electrical conductor portion is secured between said shield layer and a first spring clamp portion of said spring clamp and said second electrical conductor portion is secured between said first spring clamp portion and a second spring clamp portion of said spring clamp.

16. The cable connection system of claim 15 wherein said clamp includes a metallic tape around said spring clamp.

17. The cable connection system of claim 10 wherein said sealant includes a thermoplastic sealant.

18. The cable connection system of claim 10 wherein said sealant includes a first portion of sealant applied to an end portion of said shield layer, a second portion of sealant applied to said shield layer between said clamp and an end of said outer sheath, and a third portion of sealant applied over said clamp, said electrical conductor, and an end portion of said sheath.

19. The cable connection system of claim 10 further comprising a stress relief termination at an end of said shield layer.

20. The cable connection system of claim 10 wherein said sealant includes a heat shrink member.

* * * * *